United States Patent
Ahnert

(10) Patent No.: US 11,454,287 B2
(45) Date of Patent: Sep. 27, 2022

(54) TORSIONAL VIBRATION, CLUTCH DISK AND CLUTCH

(71) Applicant: Schaeffler Technologies AG & Co. KG, Herzogenaurach (DE)

(72) Inventor: Gerd Ahnert, Sasbach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/042,980

(22) PCT Filed: Mar. 19, 2019

(86) PCT No.: PCT/DE2019/100256
§ 371 (c)(1),
(2) Date: Sep. 29, 2020

(87) PCT Pub. No.: WO2019/192652
PCT Pub. Date: Oct. 10, 2019

(65) Prior Publication Data
US 2021/0025459 A1    Jan. 28, 2021

(30) Foreign Application Priority Data

Apr. 5, 2018   (DE) .......................... 102018107993.1

(51) Int. Cl.
*F16D 3/12*      (2006.01)
*F16D 13/68*     (2006.01)
(Continued)

(52) U.S. Cl.
CPC ............... *F16D 3/12* (2013.01); *F16D 13/68* (2013.01); *F16F 15/123* (2013.01);
(Continued)

(58) Field of Classification Search
CPC .......... F16D 3/12; F16D 13/68; F16D 13/686; F16D 2300/22; F16F 15/1204;
(Continued)

(56) References Cited

U.S. PATENT DOCUMENTS 4,467,905 A * 8/1984 Takeuchi ............ F16F 15/1205
                                                    192/212
5,257,687 A * 11/1993 Cooke ..................... F16D 13/64
                                                    192/213
11,015,677 B2    5/2021 Häßler et al.

FOREIGN PATENT DOCUMENTS

DE    102010054303 A1    6/2011
DE    102015211899 A1    12/2016
(Continued)

*Primary Examiner* — Richard M Lorence

(57) ABSTRACT

A torsional vibration damper for a clutch disk within a drive train of a motor vehicle includes an input part arranged around an axis of rotation (d), a spring device with at least three spring elements, an output part, and torque-transmitting intermediate elements. The output part can be rotated relative to the input part about the axis of rotation (d) to a limited extent against the spring device. The torque-transmitting intermediate elements are arranged between the input part and the output part for forcible radial displacement by means of cam mechanisms when the input part rotates relative to the output part. The spring device is arranged between the torque-transmitting intermediate elements, and a number of intermediate elements corresponds to a number of spring elements.

9 Claims, 6 Drawing Sheets

(51) Int. Cl.
*F16F 15/12* (2006.01)
*F16F 15/123* (2006.01)

(52) U.S. Cl.
CPC ...... *F16F 15/1205* (2013.01); *F16D 2300/22* (2013.01); *F16F 2230/0064* (2013.01); *F16F 2232/02* (2013.01)

(58) Field of Classification Search
CPC .... F16F 15/1205; F16F 15/121; F16F 15/123; F16F 2230/0064; F16F 2232/02
See application file for complete search history.

(56) References Cited

FOREIGN PATENT DOCUMENTS

| | | |
|---|---|---|
| DE | 102018108441 A1 | 10/2019 |
| EP | 0474035 A1 | 3/1992 |
| WO | 2014202072 A1 | 12/2014 |

* cited by examiner

TORSIONAL VIBRATION, CLUTCH DISK AND CLUTCH

CROSS-REFERENCE TO RELATED APPLICATIONS

This application is the United States National Phase of PCT Appln. No. PCT/DE2019/100256 filed Mar. 19, 2019, which claims priority to German Application No. DE102018107993.1 filed Apr. 5, 2018, the entire disclosures of which are incorporated by reference herein.

TECHNICAL FIELD

The present disclosure relates to a torsional vibration damper, in particular for a clutch disk within a drive train of a motor vehicle, a corresponding clutch disk and a clutch, in particular for the drive train of a motor vehicle.

BACKGROUND

Torsional vibration dampers are known in automotive engineering, for example from DE 10 2015 211 899 A1, in which an input part and an output part that can be rotated to a limited extent relative to the input part are coupled by intermediate elements and spring devices and arranged such that the spring devices are not arranged in the circumferential direction. This type of torsional vibration damper is previously known having two intermediate elements and two spring elements connecting them. Due to the configuration with two spring elements, there are only limited configuration options with regard to the performance parameters of the torsional vibration damper. In addition, there are conflicting aims in the design of such a torsional vibration damper, since on the one hand spring elements (springs) that are as long as possible are necessary to have as much potential energy available as possible. On the other hand, this leads to little space for the intermediate elements, which can be optionally deformed by the centrifugal forces. At the same time, the geometry of an embodiment having two intermediate elements and two spring elements connecting them leads to restrictions with regard to the radially inner installation space, which should be used, for example, for a friction device. In addition, the connection of the input part, for example, to lining carriers (friction rings) is limited radially on the outside to only two circumferential areas, which is disadvantageous for torque transmission, in particular at high torques.

SUMMARY

The disclosure provides a torsional vibration damper, which is of simple construction and the function of which is independent of manufacturing tolerances.

The torsional vibration damper according to the disclosure, in particular for a clutch disk within a drive train of a motor vehicle, has an input part arranged around an axis of rotation and an output part which can be rotated relative to the input part about the axis of rotation to a limited extent against the action of a spring device having a plurality of spring elements. Torque-transmitting intermediate elements, which are arranged between the input part and the output part, are arranged for forcible radial displacement by means of cam mechanisms in the event of a relative rotation of the input part and the output part, and the spring device is arranged between the intermediate elements. A number of intermediate elements is formed corresponding to the number of spring elements, distinguished in that the number is at least three.

A spring element is understood to mean a means which is composed of one or more springs. A spring is understood to mean an element which is elastically deformable and thereby builds up a restoring force. Example compression springs are those in which compression of the compression spring causes a restoring force that tends to extend the compression spring again. A spring may be constructed as a helical spring. The spring element may include a single spring or a spring assembly with at least two cooperating springs.

Torsional vibration dampers known until now having forced radial displacement of the intermediate elements are generally known with two spring elements and two intermediate elements. Both spring elements are attached to a respective intermediate element, resulting in a rectangular arrangement. A different geometrical arrangement results in the present case having three or more intermediate elements and spring elements. For example, a triangular arrangement results in a number of three (intermediate elements and spring elements), which leaves more space for other components inside the torsional vibration damper than in the known arrangement. In addition, an embodiment having more spring elements compared to the embodiment described above having two spring elements offers more design freedom in the design of the torsional vibration damper, so that other performance ranges of the torsional vibration damper are possible. Each spring element may include one or more helical compression springs.

The intermediate element, input part, and output part each have ramps on which rolling elements can roll. On the one hand, these rolling elements roll on ramps in the input part and intermediate element, while other rolling elements roll on ramps in the intermediate element and in the output part, so that torques can be transmitted from the input part via the intermediate element to the output part. The shapes of the ramps in the input part, intermediate element, and output part make it possible to define the stiffness of the damper system. The torsional vibration damper may be designed such that the corresponding spring elements are actuated in a straight line along the axis thereof. This reduces lateral loads on the spring elements and increases the durability of the connection of the spring elements to the intermediate elements.

According to an example embodiment, each spring element has an effective direction and the effective direction of a spring element spans a non-zero first angle with the effective direction of any other spring element.

The effective direction of the spring is defined, for example, by the configuration of the corresponding spring(s). The term effective direction is understood to mean the direction in which the spring element can apply or absorb forces. For example, in the case of a conventional helical compression spring, the longitudinal axis thereof represents the effective direction. Such an embodiment allows the spring element to be displaced radially outward. Such a configuration may include an odd number of intermediate elements and spring elements, i.e., having three or even five intermediate elements and spring elements, for example. For example, the effective directions of adjacent spring elements may span an angle of 60° in the case of three intermediate elements and spring elements.

According to an example embodiment, each intermediate element has a relative movement direction in which it can be moved during operation, and each spring element has an effective direction. Each effective direction spans a non-zero second angle with each relative movement direction. This means, for example, that the effective directions of the spring elements are not radially aligned. This results in the possibility of designing the spring elements in such a way that they are designed more radially on the outside, so that a larger free space is generated close to the axis.

According to an example embodiment, each spring element has an effective direction and the effective directions of all spring elements are tangential to a circle having a circle radius, the center point of which lies on the axis of rotation. Such a symmetric design offers a relatively large degree of design freedom for a corresponding torsional vibration damper, e.g., radial arrangement of the spring element lying far outside is possible. The torsional vibration damper can thus be designed simply.

According to an example embodiment, all intermediate elements are of identical design. This enables a simple structure and a simple design of the torsional vibration damper. In principle, the intermediate elements can be formed to be axially symmetric to an axis of the intermediate element or, if necessary, also to be asymmetric in this sense. In this case, it is also possible to use the individual intermediate elements rotated by 180° relative to one another. For example, also in interaction with identical intermediate elements, this may enable a simple design of a symmetric torsional vibration damper.

According to an example embodiment, a first spring element, and a second spring element that differs from the first spring element, are formed. The formation of first and second spring elements increases the possibilities when designing the torsional vibration damper, since other damping characteristics and frequency spectra can be achieved.

Furthermore, a clutch disk for a clutch, in particular in the drive train of a motor vehicle, is proposed which includes a torsional vibration damper as described here, and a clutch which includes a corresponding clutch disk. In the case of the proposed clutch disk, a lining ring may be fastened radially on the outside to the input parts of the torsional vibration damper. Furthermore, a motor vehicle having such a clutch is proposed. The details and advantages disclosed for the torsional vibration damper can be transferred and applied to the clutch disk, the clutch and the motor vehicle, and vice versa.

As a precaution, it should be noted that the numerals used here ("first", "second", etc.) serve primarily (only) to distinguish between several similar objects, sizes, or processes, and in particular no dependency and/or sequence of these objects, sizes or processes mandatory to each other is purported. If a dependency and/or sequence is necessary, this is explicitly stated here or results in a manner obvious to the person skilled in the art when studying the specifically described configuration.

BRIEF DESCRIPTION OF THE DRAWINGS

Both the disclosure and the technical environment will be explained in more detail below with reference to the figures. It should be pointed out that the disclosure is not intended to be limited by the exemplary embodiments shown. For example, unless explicitly stated otherwise, it is also possible to extract partial aspects of the matter explained in the figures and to combine same with other components and findings from the present description and/or figures. For example, it should be pointed out that the figures and, in particular, the proportions shown, are only schematic. The same reference numerals designate the same objects, so that explanations from other figures can be used as a supplement. In the figures.

DETAILED DESCRIPTION

Figure 1:
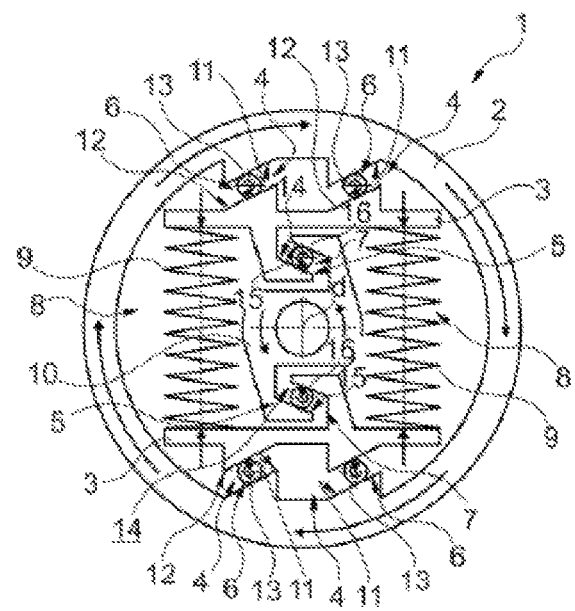
FIGS. 1 and 2 show a known torsional vibration damper.

In the description of the figures, the same parts are provided with the same reference symbols. The torsional vibration damper 1 shown as known in FIGS. 1 and 2 comprises an input part 2, intermediate elements 3, cam mechanisms 4, 5, having ramp devices 6, 7, and a spring device 8 having spring elements 9 arranged between the intermediate elements 3 ,and an output part 10. The input part 2 of the torsional vibration damper 1 of FIG. 1 has ramps 11, such as cam tracks of the ramp devices 6, in the two cam mechanisms 4, for example, which are opposite one another with respect to the axis of rotation d of a shaft 17. Mutually opposite intermediate elements 3, each having two ramps 12 complementary to the input part 2, such as cam tracks of the ramp devices 6, and the rolling elements 13 complete the cam mechanism 4 between the input part 2 and the intermediate elements 3. When the input part 2 is rotated around the axis of rotation d, the rolling elements 13 are guided on the ramps 11, 12 such that the radial movement of the intermediate elements 3 results in a parallel spring compression of the spring elements 9, which are arranged between the intermediate elements 3. The ramps 11 of the input part 2 and the ramps 12 of the intermediate elements 3, together with the associated rolling elements 13, form the cam mechanism 4.

The intermediate elements 3 each comprise a further ramp 14 radially on the inside, which are operatively connected to ramps 15 arranged in the output part 10. When the output part 10 is rotated around the axis of rotation d in the opposite direction to the rotation of the input part 2, the intermediate elements 3 are also guided via rolling elements 16 which roll freely between the appropriately designed ramps 14, 15 such that the movement thereof again signifies a parallel spring compression of the spring elements 9. The ramps 14 of the intermediate elements 3 and the ramps 15 of the output part 10 together with the associated rolling elements 16 form the cam mechanism 5.

As a result of the coupling of the two cam mechanisms 4, 5 via the intermediate elements 3, the total angle of rotation between the input part 2 and the output part 10 results from the sum of the angles of rotation which are set in the respective cam mechanism 4, 5 having a certain spring compression of the spring elements 9. The torque at the input part 2 for the rotational movement is supported as a pure torsional moment at the output part 10. The unit consisting of intermediate elements 3 and spring elements 9 is not subject to an external torque effect, but determines the amount of the transmitted torque via the amount of force from the parallel spring compression of the spring elements 9.

The ramps 11, 12, 14, 15 of the cam mechanisms 4, 5 of the torsional vibration damper 1 are linear in design, for example, to transmit the movements during rotation in the marked direction and to indicate the ability to transmit torque in contact via the rolling elements 13, 16 in this direction. In the case of constructions carried out, on the other hand, the design of the ramps 11, 12, 14, 15 is a free form as a result of the desired translations for the torsion characteristic curve while fulfilling the rolling conditions for the rolling elements 13, 16.

Figure 2:
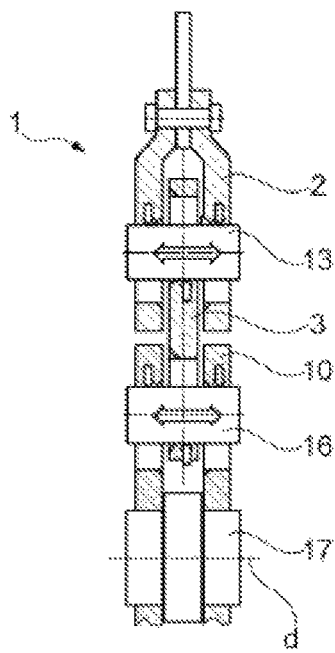
Figure 3:
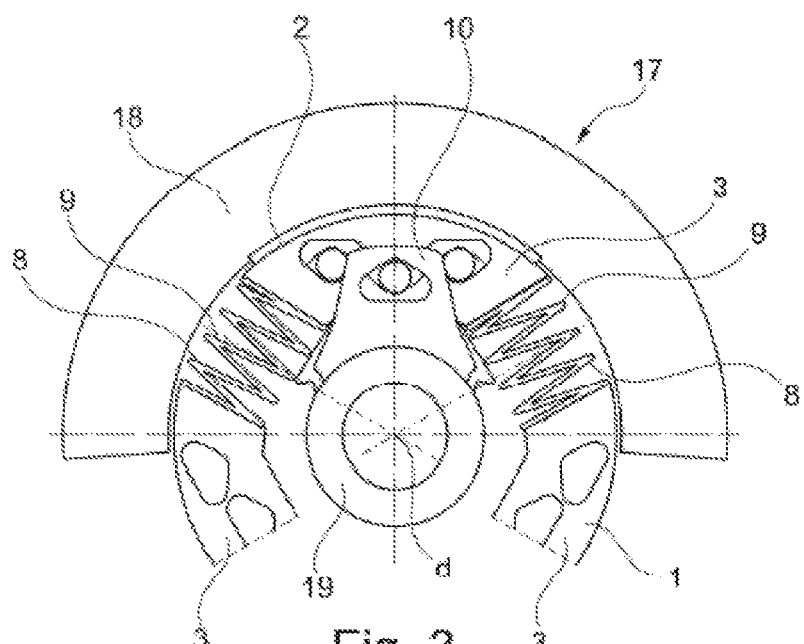
FIG. 3 shows a section of a first example of a torsional vibration damper.

FIG. 3 shows an example of a clutch disk 17 having a torsional vibration damper 1. The input part 2, output part 10, and intermediate elements 3 are operatively connected to one another analogously to those in the example in FIGS. 1 and 2. Reference is made to the statements made there, so that here and in the following, essentially the differences with respect to the torsional vibration damper assumed to be known are described. The same elements are provided with identical reference symbols in all figures.

The torsional vibration damper 1 in this example has in comparison to the example from FIGS. 1 and 2, three intermediate elements 3, three input parts 2, three output parts 10, and a spring device 8 having three spring elements 9. Individual springs or spring assemblies made of several springs can be formed as spring elements 9. For the sake of clarity, only one input part 2, one output part 10 and two spring devices 8 are shown in FIG. 3. Each input part 2 is connected radially on the outside to a lining ring 18 which is connected directly or indirectly to friction linings (not shown here) so that a friction clutch can be assembled together with a pressure plate. The output part 10 can be rotated to a limited extent around the axis of rotation d relative to the corresponding input part 2 against the action of the spring device 8 having the two spring elements 9 arranged on the corresponding intermediate piece 3. The output parts 10 are connected via a hub 19 to a shaft (not shown here), for example, a transmission input shaft. In operation, a torque can be transmitted from the respective input part 2, and thus from the lining ring 18, via the intermediate elements 3 to the output part 10 and the hub 19. In this example, all intermediate elements 3 are identical. In this example, all spring elements 9 are also identical.

Figures 4, 5:
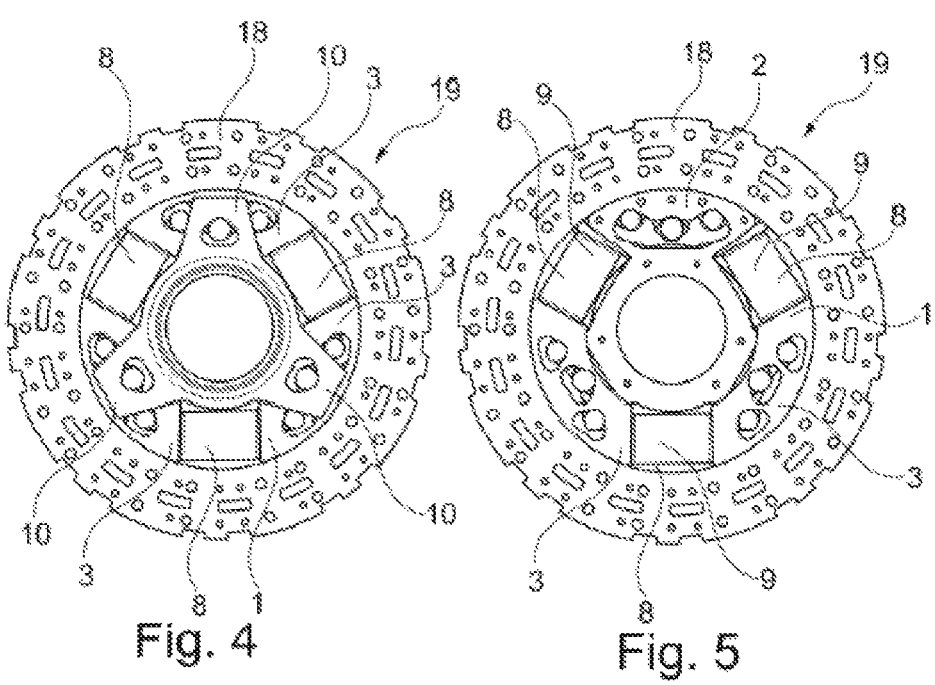
FIGS. 4 and 5 show further views of the first example of a torsional vibration damper.

FIGS. 4 and 5 show two views of a clutch disk 17 having three input parts 2 (only one input part 2 is shown in FIG. 5 for the sake of clarity), three output parts 10 and three intermediate parts 3, which are connected to one another by three spring elements 9 of a spring device 8. The torsional vibration damper 1 is shown in the undeflected state. The intermediate elements 3 are identical, as are the spring elements 9.

Figure 6:
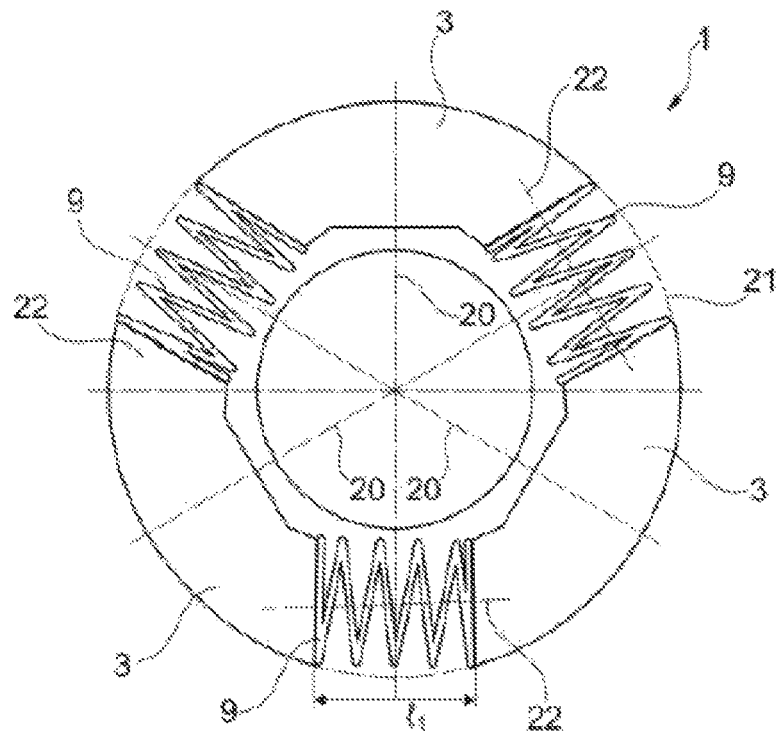
FIGS. 6 and 7 show the intermediate elements and spring elements of the first example in the undeflected and deflected state.
Figure 7:
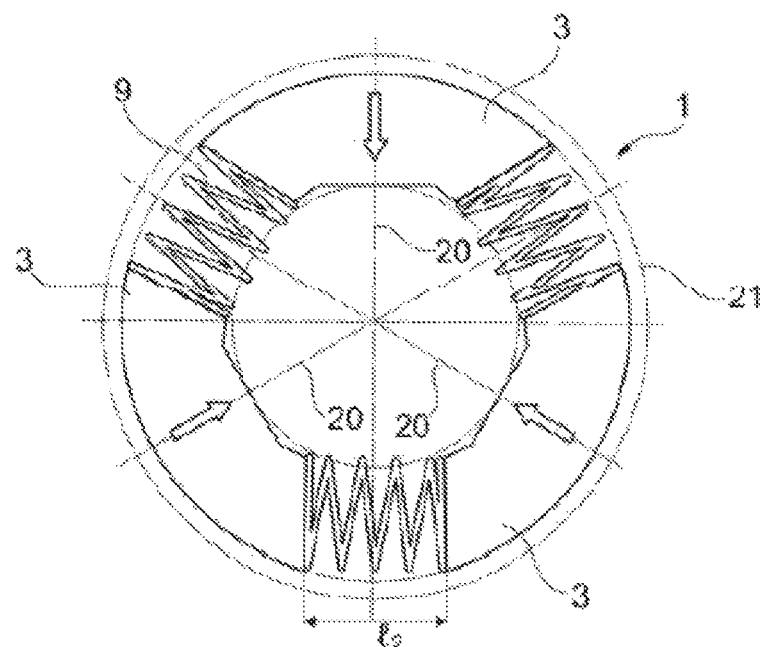

FIG. 6 shows part of a torsional vibration damper 1 according to FIGS. 3 to 5 in the undeflected state, and FIG. 7 shows the same part of the torsional vibration damper 1 in the deflected state. Due to the design of the intermediate elements 3 and the ramps (not shown here) of the intermediate parts 3 and the input parts 2 and output parts 10 (not shown here), a movement of the intermediate parts 3 is only possible in the radial direction, where corresponding arrows in this relative movement direction 20 are shown in FIG. 7. FIGS. 6 and 7 also show the outer circumference 21 of the undeflected intermediate elements 3. It can be seen that the outer circumference is reduced in the deflected state by the radially inward movement of the intermediate elements 3 and the spring elements 8 are compressed. The spring elements 8 have a first length l1 in the undeflected state and a second length l2 in the deflected state, which is smaller than the first length $l_1$. The spring elements (energy storage) 9 are thus compressed in the deflection by the intermediate elements 3.

Each spring element 9 has an effective direction 22. The effective direction 22 is displaced in parallel by the deflection of the intermediate elements 3 (cf. FIGS. 6 and 7). In addition, the effective directions 22 are not aligned parallel to one another.

Figure 9:
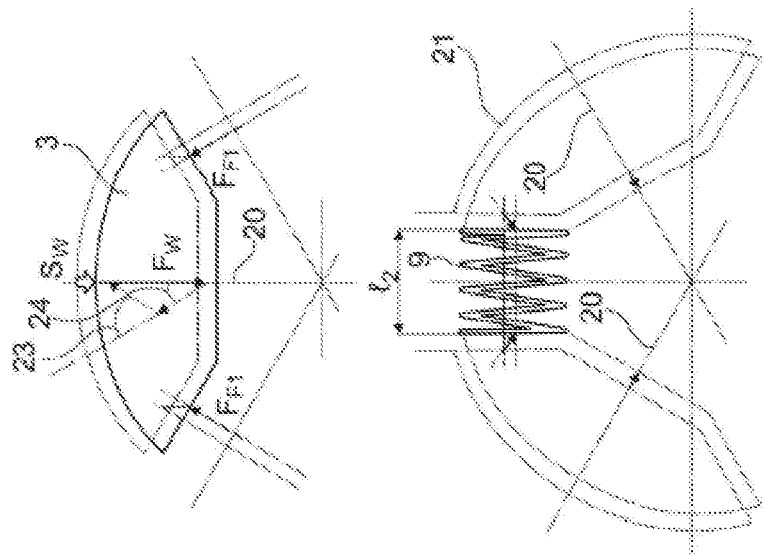
FIGS. 8 and 9 show a detailed view of the forces applied to the intermediate element in the first example of a torsional vibration damper in the undeflected and deflected state.
Figure 8:
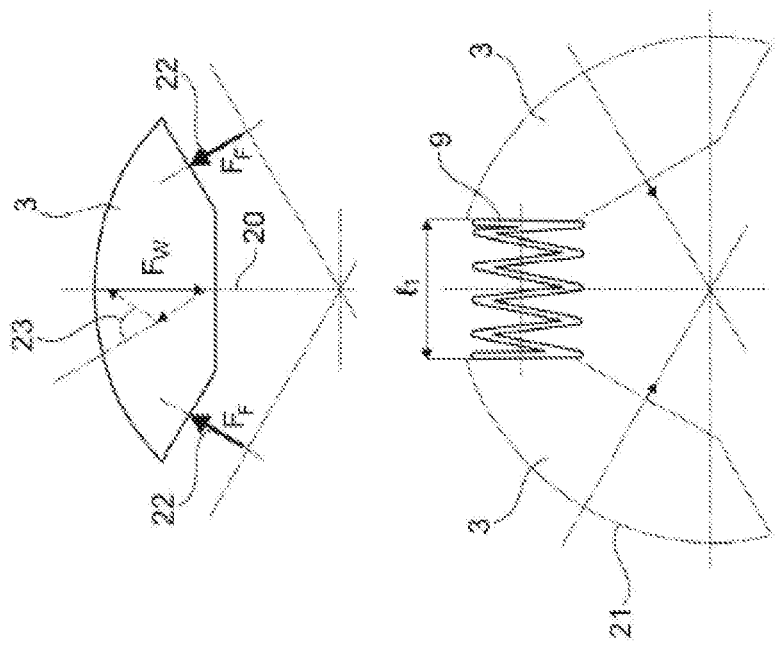

FIGS. 8 and 9 schematically show the effective directions 22 and applied forces in the example according to FIGS. 3 to 7. FIG. 8 shows the undeflected case analogous to FIG. 6. The spring elements 9 exert a spring force $F_F$ in the effective direction 22 on the intermediate element 3. The spring forces $F_F$ are in vectorial equilibrium with the rocker force $F_W$ applied to the intermediate element 3. If the rocker force $F_W$ increases, the intermediate element 3 is pressed radially inward in the direction of the rocker force $F_W$. As a result, the spring elements 9 are compressed and the spring force $F_F$ increases until the spring forces $F_F$ are again in vector equilibrium with the rocker force $F_W$. The deflection of the spring elements 9 is reduced from the first length $l_1$ (see FIG. 8) to the second length $l_2$ (see FIG. 9).

FIGS. 8 and 9 also show a first angle 23 between the effective directions 22 of two adjacent spring elements 9, this being non-zero for all effective directions 22 of all spring elements 9. Furthermore, by way of example, FIG. 9 shows a second angle 24 between the effective direction 22 of a spring element 9 and a relative movement direction 20 of an intermediate element 3.

FIGS. 10 to 13 show two further examples of a torsional vibration damper 1 in which are formed four intermediate elements 3 having a spring device 8 with four spring elements 9. Each spring element 9 is connected to two intermediate elements 3 adjacent in the circumferential direction and connects them to one another.

Figure 10:
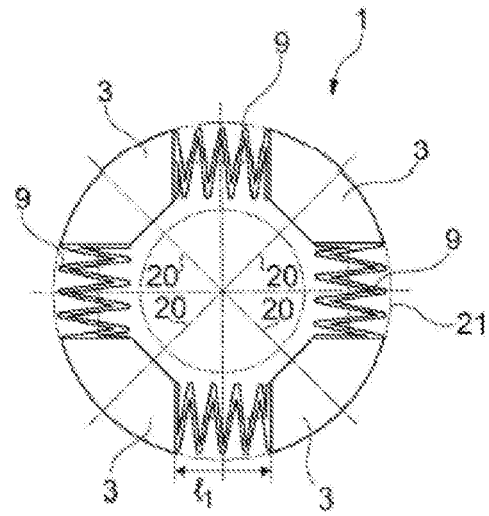
FIGS. 10 and 11 show a second example of a torsional vibration damper in the undeflected and deflected state in section.
Figure 11:
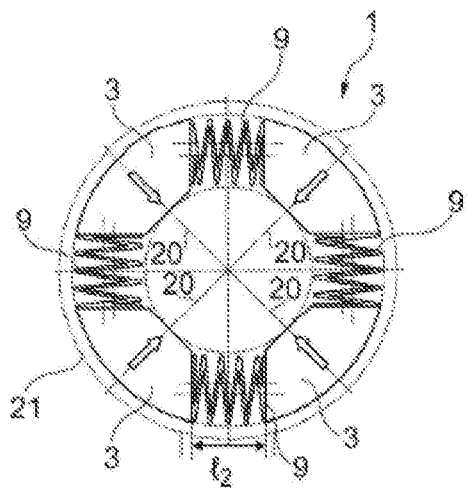

FIGS. 10 and 11 show an example of a torsional vibration damper 1 in the undeflected state which is rotationally symmetric. Here, four identical spring elements 9 are formed between the intermediate elements 3. All spring elements 9 here have a first length $l_1$ in the undeflected state. FIG. 11 shows an example of the torsional vibration damper 1 in the deflected state. Here, the spring elements 9 are compressed to a second length $l_2$ by the movement of the intermediate elements 3 in the direction of the relative movement direction 20.

Figure 12:
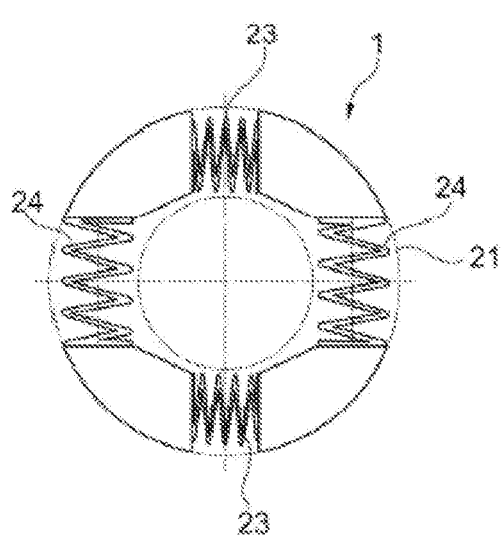
FIGS. 12 and 13 show a third example of a torsional vibration damper in the undeflected and deflected state in section.
Figure 13:
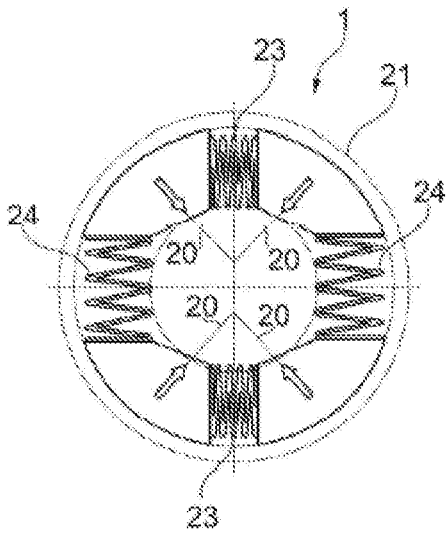

FIGS. 12 and 13 show a further example of a non-rotationally symmetric torsional vibration damper 1 having four non-identical intermediate elements 3 and spring elements 9. Here are formed two opposite first spring elements 29 and two opposite second spring elements 30, which differ in the length thereof in the undeflected state and possibly in the spring constant thereof. The intermediate elements 3 lying therebetween in the circumferential direction are correspondingly adapted so that all intermediate elements 3 have a common outer circumference 21. The first 29 and second spring elements 30 and the corresponding ramps of the intermediate elements 3 are designed such that also in this example, the intermediate elements 3 are displaced radially inward in the deflected state.

By forming first 29 and second spring elements 30, a torsional vibration damper 1 can be achieved, which enables making the use of the interior between the intermediate elements 3 more flexible. A comparison of FIGS. 13 and 11 shows that the asymmetric configuration of the torsional vibration damper 1 according to FIGS. 12 and 13 also results in a change in the relative movement directions 20 of the intermediate elements 3.

Figure 14:
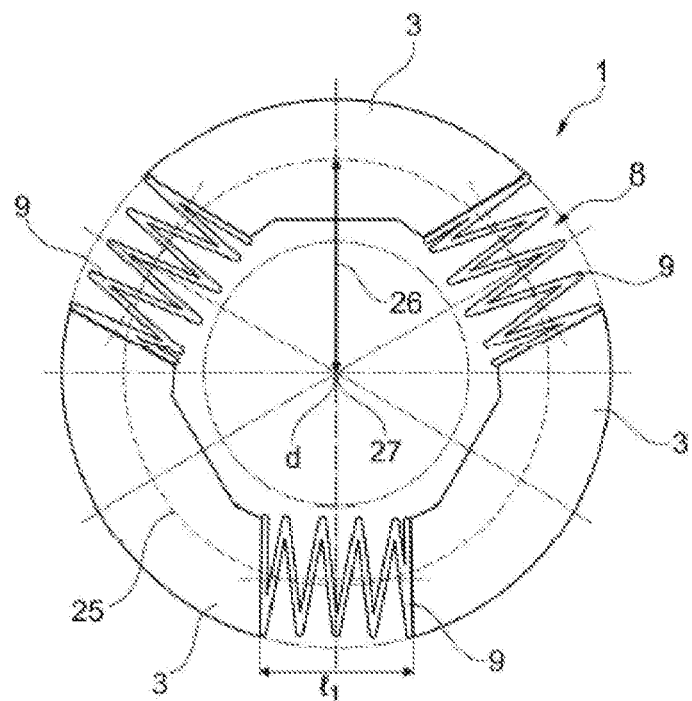
FIG. 14 shows details of the first example of a torsional vibration damper.

FIG. 14 shows a further example of a torsional vibration damper 1 having three intermediate elements 3 and a spring device 8 having three spring elements 9. Each spring element 9 has an effective direction 22, which is defined by the orientation and configuration of the spring element 9. The spring elements 9 are arranged so that they are tangential to a circle 25 which has a circle radius 26 and the center point 27 of which lies on the axis of rotation d.

Figure 15:
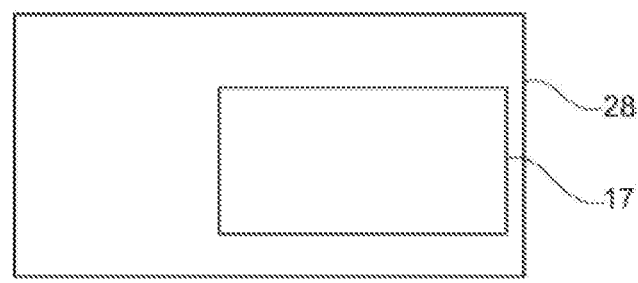
FIG. 15 shows very schematically a friction clutch having torsional vibration dampers.

FIG. 15 very schematically shows a clutch 28 which comprises a clutch disk 17 which comprises at least one torsion damper 1 as described here.

REFERENCE NUMERALS

1 Torsional vibration damper
2 Input part
3 Intermediate element
4 Cam mechanism
5 Cam mechanism
6 Ramp device
7 Ramp device
8 Spring device
9 Spring element
10 Output part
11 Ramp
12 Ramp
13 Rolling element
14 Ramp
15 Ramp
16 Rolling element
17 Clutch disk
18 Lining ring
19 Hub
20 Relative direction of movement
21 Outer circumference
22 Effective direction
23 First angle
24 Second angle
25 Circle
26 Circle radius
27 Center point
28 Clutch
29 First spring element
30 Second spring element
d Axis of rotation
$F_F$ Spring force
$F_W$ Rocker force
$l_1$ First length
$l_2$ Second length

The invention claimed is:

1. A torsional vibration damper for a clutch disk within a drive train of a motor vehicle, comprising:
an input part arranged around an axis of rotation;
a spring device comprising at least three spring elements;
an output part which can be rotated relative to the input part about the axis of rotation to a limited extent against the spring device;
torque-transmitting intermediate elements arranged between the input part and the output part for forcible radial translation by means of cam mechanisms when the input part rotates relative to the output part, wherein:
the spring device is arranged between the torque-transmitting intermediate elements; and
a number of intermediate elements corresponds is equivalent to a number of spring elements.

2. The torsional vibration damper of claim 1, wherein:
each of the at least three spring elements has an effective direction; and
the effective direction of each of the at least three spring elements spans a non-zero first angle with the effective direction of any other of the at least three spring elements.

3. The torsional vibration damper of claim 1, wherein:
each intermediate element comprises a relative movement direction in which it can be moved during operation; and
each of the at least three spring elements has an effective direction that spans a non-zero second angle with each relative movement direction.

4. The torsional vibration damper of claim 1, wherein:
each of the at least three spring elements comprises an effective direction; and
each effective direction is tangential to a circle having a circle radius with a center point lying on the axis of rotation.

5. The torsional vibration damper of claim 1, wherein all intermediate elements are of identical design.

6. The torsional vibration damper of claim 1, wherein the spring device comprises non-identical spring elements.

7. A clutch disk comprising the torsional vibration damper of claim 1.

8. The clutch disk of claim 7, further comprising a lining ring fastened on a radial outside of the input part.

9. A clutch comprising the clutch disk of claim 7.

* * * * *